United States Patent [19]

Downey

[11] 4,355,462
[45] Oct. 26, 1982

[54] PROCESS MACHINE HAVING A SINGLE CAM ACTUATOR PER CATEGORY OF PROCESSING FUNCTION

[75] Inventor: Rogers B. Downey, Lexington, Mass.

[73] Assignee: Polaroid Corporation, Cambridge, Mass.

[21] Appl. No.: 137,435

[22] Filed: Apr. 4, 1980

[51] Int. Cl.³ ............................................. B23P 19/00
[52] U.S. Cl. ..................................... 29/791; 29/564.1
[58] Field of Search ...................... 29/38 A, 38 B, 563, 29/564.1, 771, 783, 785, 786, 791-794, 822; 408/44, 45, 71

[56] References Cited

U.S. PATENT DOCUMENTS

| | | | |
|---|---|---|---|
| 2,370,828 | 3/1945 | Widmont | 29/564.1 |
| 3,110,201 | 11/1963 | Fusik | 29/783 X |
| 3,233,072 | 2/1966 | Garver et al. | 219/93 |
| 3,368,056 | 2/1968 | Garver et al. | 219/80 |
| 3,689,965 | 2/1972 | Bertoglio | 408/45 |
| 3,693,231 | 9/1972 | Scharf | 29/563 |
| 4,184,236 | 1/1980 | Nutt | 29/564.1 |

*Primary Examiner*—Ervin M. Combs
*Attorney, Agent, or Firm*—John J. Kelleher

[57] ABSTRACT

A machine having a multiplicity of work stations for performing a series of sequential operations on a work piece has all of said operations grouped into a plurality of generally homogeneous categories, with the motions required to perform operations in any particular category being provided by a single motion-generating cam, there being one cam for each category of operations.

11 Claims, 6 Drawing Figures

PROCESS MACHINE HAVING A SINGLE CAM ACTUATOR PER CATEGORY OF PROCESSING FUNCTION

BACKGROUND OF THE INVENTION

1. Field of the Invention

The present invention relates to multi-workstation machines for automatically performing a series of sequential operations on a workpiece, in general, and to such machines for assembling an article of manufacture, in particular.

2. Description of the Prior Art

For rapid assembly of an article of manufacture or of a subassembly thereof, it is well-known to provide an automated assembly machine having a multiplicity of workstations where a series of sequential assembly operations are performed on said article. Such assembly machines move the article from workstation to workstation as part of the overall assembly process.

Workstations in prior art assembly machines tend to be bulky in that each station has its own motion-generating apparatus or set of cams that are clustered about and are in close proximity to their respective workstations in order to provide convenient workstation access to the motion provided by said cams. These motion-generating cams are usually driven by a common driving force such as a single electric motor. Some assembly machines utilize a workstation cluster cam arrangement with two or more drive motors and with means to compensate for any unacceptable difference in rotational speed between said drive motors.

In the design of these prior art assembly machines, it is normal design practice to add an additional cam to a particular workstation whenever a required motion is not available from other cams already present at said workstation. Very often, the addition of a cam to an assembly machine workstation that already has other cams with their own different, motion-generating surfaces will necessitate a change in the cam shaft position of one or more of said other cams because of the incompatibility between the motions generated by said other cams and the added cam.

SUMMARY OF THE INVENTION

In accordance with the teachings of the present invention, a machine having a multiplicity of workstations for performing a series of sequential operations on a workpiece employs a plurality of master cams to provide all mechanical motions necessary to perform said operations on said workpiece. This is accomplished, in part, by grouping all of the required motions needed to perform the assembly operation into one of several possible homogeneous groups or categories having one cam for each category with each category cam having a predetermined motion-generating surface that is in a fixed position with respect to the shaft (or member) on which said cam is located, said cam providing all of the motions that are required within its associated group or category. By utilizing a plurality of cams in this manner whose motions are predetermined and readily available to all of said multiplicity of workstations, the average number of cams required per workstation is reduced and average workstation size is reduced. In addition, before assembly machine design is initiated, the machine designer is aware that the motion generated by each category cam is unalterably predetermined and, therefore, the potential problem of incompatibility between repositioned workstation cams is avoided.

DESCRIPTION OF THE PREFERRED EMBODIMENTS

Figure 1:
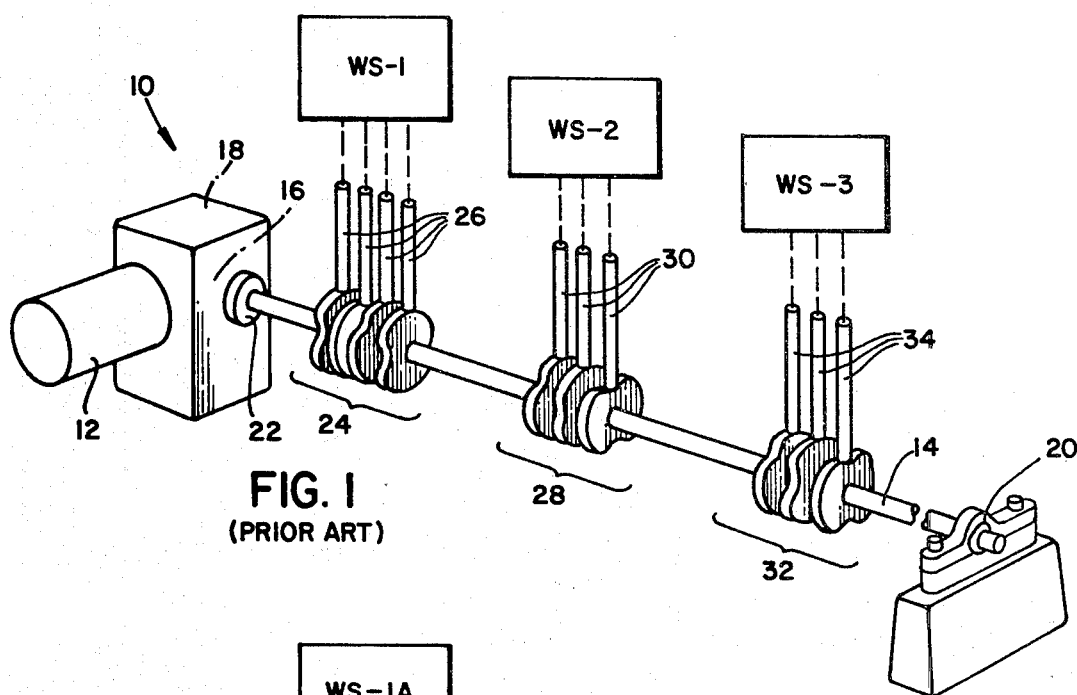
FIG. 1 is a schematic diagram of an assembly machine with a multiplicity of cluster-cam workstations in accordance with the prior art.

To facilitate understanding the inventive concept of the present invention, an assembly machine representative of the type generally employed in the prior art will be described before a description of the present invention is initiated. Referring now to the drawings and specifically to FIG. 1, numeral 10 generally indicates a multi-workstation assembly machine constructed in accordance with the prior art.

In FIG. 1, electric motor 12 drives or rotates cam shaft 14 about axis 16 through speed reduction gear 18 when said motor 12 is connected to a source of energy (not shown). Cam shaft 14 is rotatably mounted at one end by bearing 20 and at the other end opposite said bearing 20 end by reduction gear mounted bearing 22. Cam shaft 14 has three groups of cams fixedly mounted thereon for rotation therewith. Cam group 24 includes four cams that provide four different mechanical movements or motions to workstation one (WS-1) through their associated cam followers 26. Cam group 28 includes three cams that provide three different mechanical movements to workstation two (WS-2) through their associated cam followers 30. Cam group 32 includes three cams that provide three different mechanical movements to workstation three (WS-3) through their associated cam followers 34. The mechanical movements provided by the cams in cam groups 24, 28 and 32 are produced when cam shaft 14 is rotated about axis 16 by electric drive motor 12 through reduction gear 18.

The cams in cam groups 24, 28 and 32 are clustered about or are in fairly close proximity to WS-1, WS-2 and WS-3, respectively. If additional mechanical motions are required by a workstation such as WS-2, an additional mechanical motion generating cam would be added to cam group 28. The addition of such a cam sometimes creates an incompatibility between the motions generated by the existing cams and the added cam which may require corrective action such as cutting a new key-way on one or more of said existing cams so that they can be repositioned on their cam shaft. In addition, as more and more cams are added to a cam group, workstation size, which includes its associated cam group, will also increase in size. As workstation size increases as a result of the numbers of cams associated with a workstation increases, the overall size of an assembly machine that employs such workstations will also increase.

Figure 2:
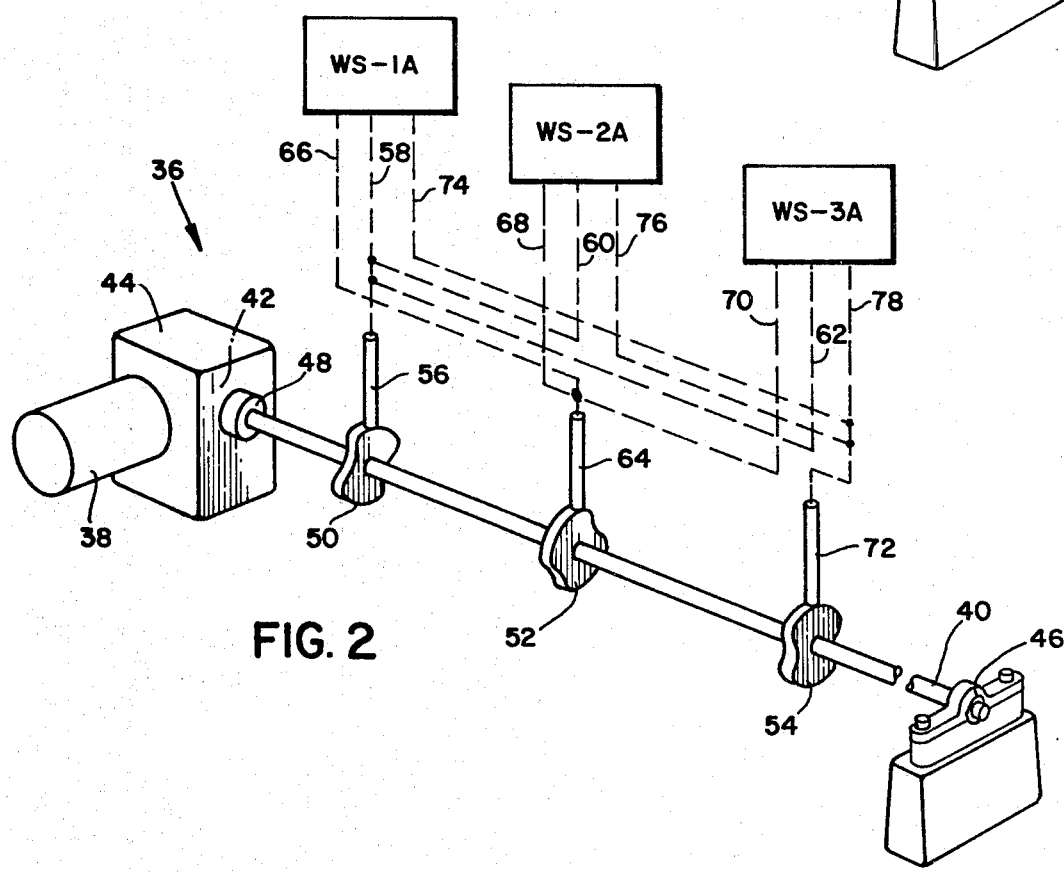
FIG. 2 is a schematic diagram of a three master cam assembly machine with a multiplicity of workstations in accordance with the present invention.

Turning now to the present invention, in FIG. 2 numeral 36 generally indicates a multi-workstation assembly machine constructed in accordance with the present invention. Electric motor 38 rotates cam shaft 40 about axis 42 through speed reduction gear 44 when said motor 38 is connected to a source of energy (not shown). Cam shaft 40 is rotatably mounted at one end by bearing 46 and at the end opposite said bearing 46 end by reduction gear mounted bearing 48. Cam shaft 40 has cams 50, 52 and 54 fixedly mounted thereon for rotation therewith. Cam 50 provides a first mechanical movement to workstation one-A (WS-1A), workstation two-A (WS-2A) and workstation three-A (WS-3A) through cam follower 56 and paths 58, 60 and 62, respectively. Cam 52 provides a second mechanical movement to workstation one-A (WS-1A), workstation two-A (WS-2A) and workstation three-A (WS-3A) through cam follower 64 and paths 66, 68 and 70, respectively. Cam 54 provides a third mechanical movement to WS-1A, WS-2A and WS-3A through cam follower 72 and paths 74, 76 and 78, respectively. The above-mentioned "paths" between cam followers 56, 64 and 72 and WS-1A, WS-2A and WS-3A may include any number of conventional motion transmitting devices such as arms, linkages, couplings, etc. and the like suitable for the motion transmitting task involved.

All of the motions generated by cams 50, 52 and 54 are utilized, to varying degrees, by every assembly machine 36 workstation as explained above. Workstation 79 in FIG. 3 is an example of a typical workstation in assembly machine 36 where each of the cam motions produced by cams 50, 52 and 54 are employed.

Figure 3:
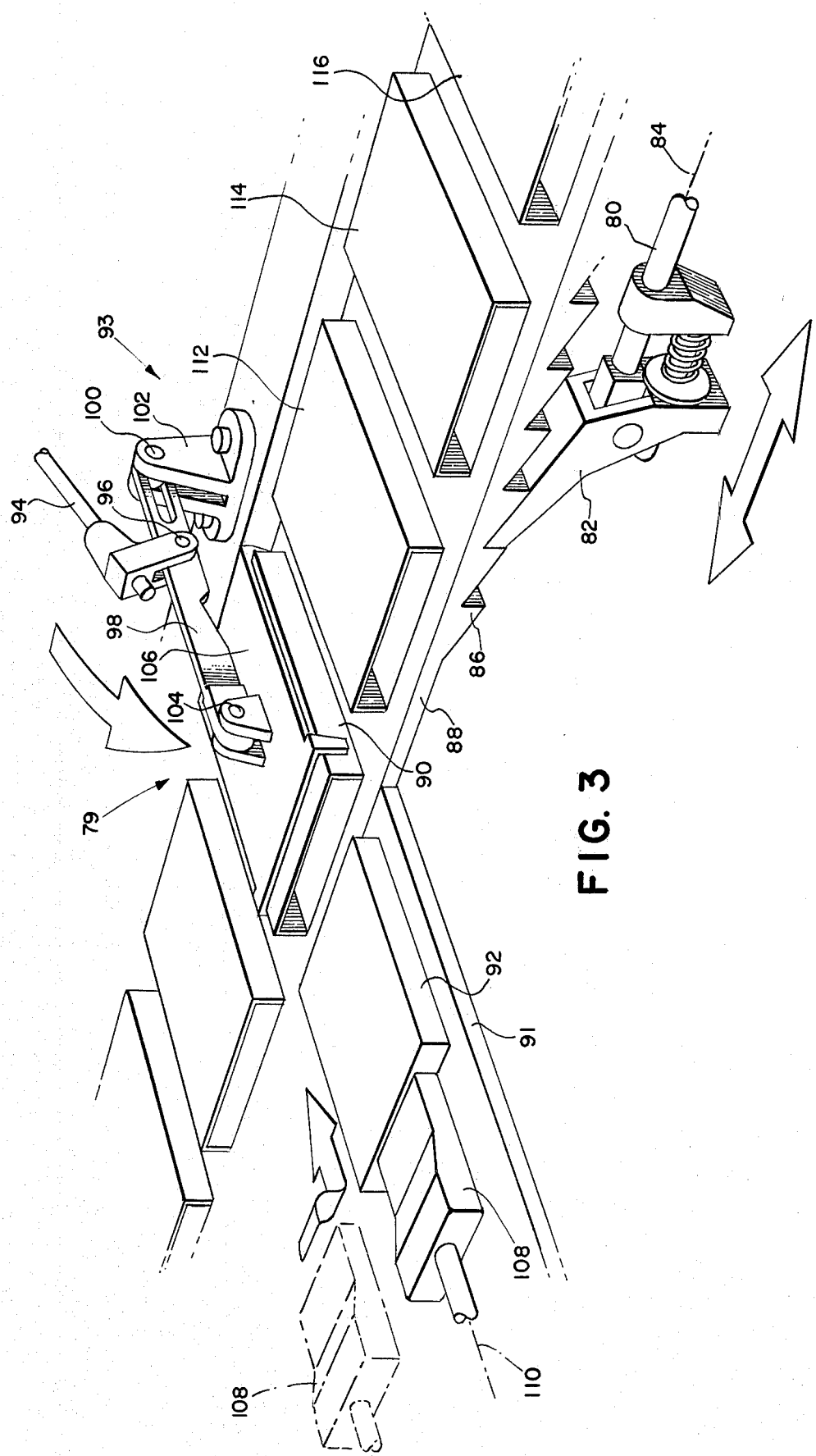
FIG. 3 depicts a workpiece assembly operation at a workstation of an assembly machine incorporating the inventive concept of the present invention.

With reference to FIG. 3, the mechanical motion provided by cam 50 (FIG. 2) is coupled to shaft 80 and spring loaded pawl 82, by conventional coupling means (not shown), to produce a force along shaft axis 84. Pawl 82 engages ratchet 86 and the cam-generated translational/reciprocating motion of shaft 80 moves conveyor and container 90 positioned thereon into the workstation 79 position shown in FIG. 3. As container 90 is being positioned to workstation 79 by conveyor 88 and its associated cam 50 actuated ratchet mechanism 82/86, conveyor belt 91 positions container insert 92 to the position shown in said FIG. 3 by a ratchet mechanism (not shown) similar to ratchet mechanism 82/86, a mechanism that is also actuated by the motions provided by said cam 50.

After container 90 is positioned to workstation 79, hold-down clamp 93 is rotated to the position shown in FIG. 3 by the motions generated by cam 52 (FIG. 2) where said clamp 93 engages and temporarily maintains said container 90 in a fixed position with respect to conveyor 88. The motions produced by said cam 52 are coupled to shaft 94 by conventional coupling means (not shown). Shaft 94 is pivotally mounted at pin 96 to arm 98 and said arm 98 is pivotally and slidably mounted at pin 100 to support bracket 102. Arm 98 is also pivotally mounted at 104 to brace plate 106. After container 90 is in the position shown in FIG. 3, brace plate 106 is pivoted into engagement with container 90 by a motion generated by said cam 52 (FIG. 2) acting on shaft 94 that causes arm 98 to pivot about pin 100 and move brace plate 106, which is pivotally attached to said arm 98, into engagement with container 90.

As hold-down clamp 93 is being moved to the position shown at workstation 79 in FIG. 3 by the motions of cam 52, said cam 52 motions are also employed to move ram 108 from the positon shown in phantom to a position adjacent container insert 92, for subsequent movement of said insert 92 into container 90 by said ram 108. The linkage that connects the motions of cam 52 to ram 108 is of conventional design and therefore, a description of said linkage has been avoided.

After container 90, container insert 92, hold-down clamp 93 and ram 108 are in the position shown in FIG. 3 with said ram 108 adjacent container insert 92, container insert 92 is pushed into container 90 by ram 108. Ram 108 movement for the purposes of pushing container insert 92 into container 90 results from motions generated by cam 54 which is coupled to ram 108 by conventional coupling means (not shown), and the force produced by said cam 54 are applied to ram 108 along ram axis 110. Additional containers 112, 114, 116, etc. are filled by additional container inserts (not shown) as they and their container inserts are moved into workstation 79 by the motions of cam 50, are held in place as a result of the motions of cam 52 and are filled with the container insert as a result of the motions of cam 54. The times of occurrence of the motions representative of those generated by the cams in the assembly apparatus in the preferred embodiment of the present invention are graphically illustrated in FIG. 4.

Figure 4:
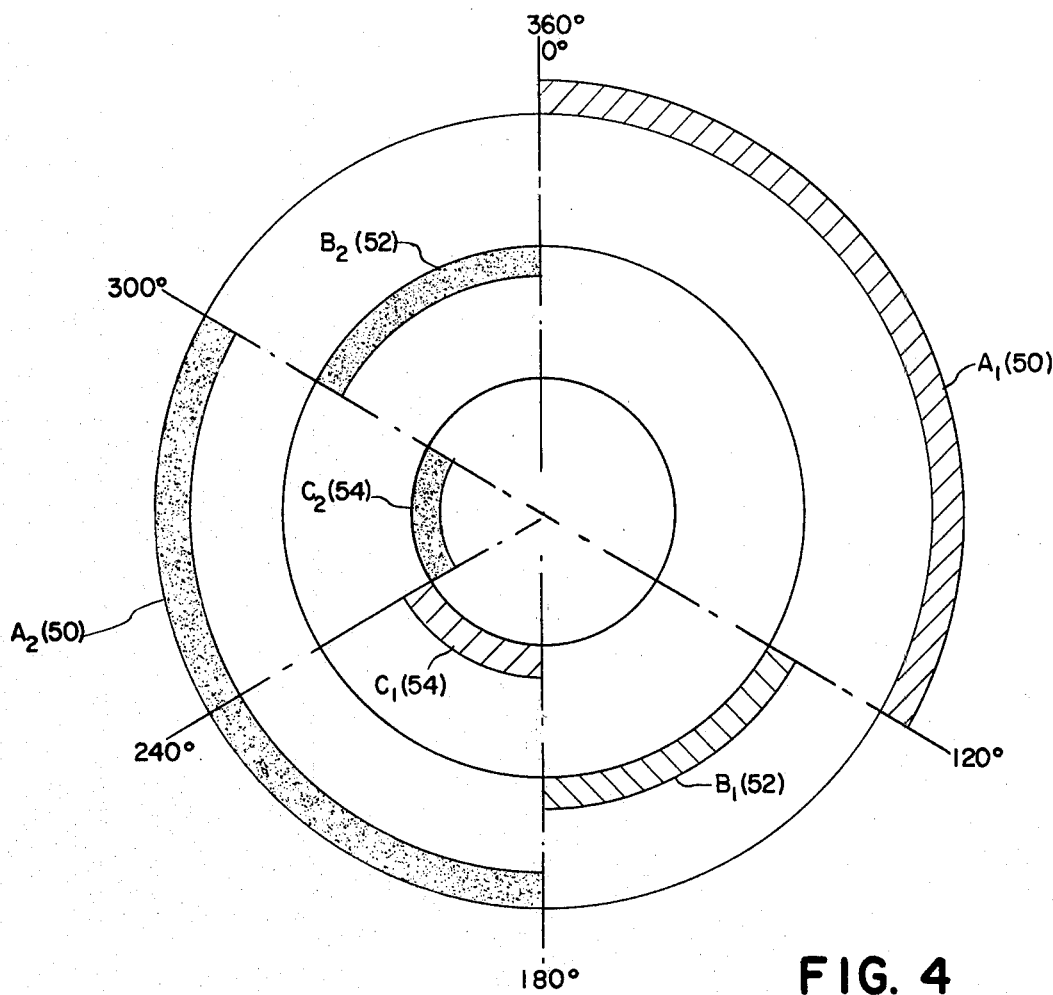
FIG. 4 depicts the times of occurrence of the motions generated by the three cams employed in the present invention as a function of degrees of revolution of the cams input or drive member.

A graph of the movement of cams 50, 52, and 54 (FIG. 2) as a function of the angular rotation of their input drive or camshaft 40 (also FIG. 2) is shown in FIG. 4. In FIG. 4, all of the cam 50, 52 and 54 generated movements serially occur within one revolution of camshaft 40. $A_1/A_2$ represents movements of cam 50; $B_1/B_2$ represents movements of cam 52; and $C_1/C_2$ represents movements of cam 54. Movements $A_1$, $B_1$ and $C_1$ represent cam 50, 52 and 54 movements that are employed to move a workpiece, position a tool adjacent said workpiece and then actuate said tool to perform an operation or manipulation on said workpiece, respectively, as the followers of said cams move from an initial or reference position. Movements $A_2$, $B_2$ and $C_2$ represent cam 50, 52 and 54 movements, respectively, back to said initial positions. The motions generated by cam 50 are utilized between 0° and 120° of camshaft 40 rotation, the motions generated by cam 52 are utilized between 120° and 180° of camshaft 40 rotation, and the motions generated by cam 54 are utilized between 180° and 240° of camshaft 40 rotation. Cams 50, 52 and 54 return to their initial positions between 180° and 300°, between 300° and 360° and between 240° and 300°, respectively. All of the motions generated by cams 50, 52 and 54 are initiated and completed within 360° of camshaft 40 rotation. In addition, followers 56, 64 and 72 of cams 50, 52 and 54, respectively, return to their initial positions within the same 360° of camshaft 40 rotation.

Cams 50, 52 and 54 are of the positive motion type because of the heavier workloads that these cams are subjected to since each of said cams must provide motions or movements to more than one workstation. The positive motion cam is more expensive than those that are not of the positive motion type. However, the overall cost of positive motion cams in an assembly machine, for example, is substantially less than the cost of providing required workstations or movements by means of non-positive motion cams.

Figure 5A:
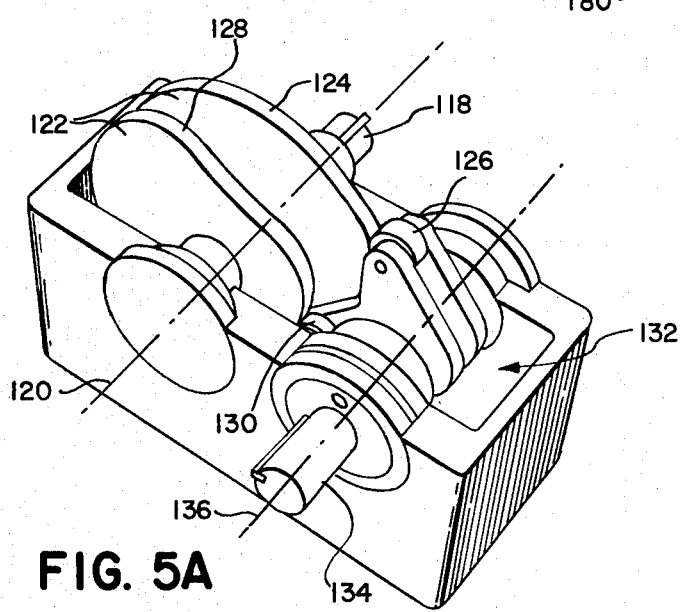
FIG. 5A is an elevational view of a positive motion cam of the type employed as a master cam in the present invention.
Figure 5B:
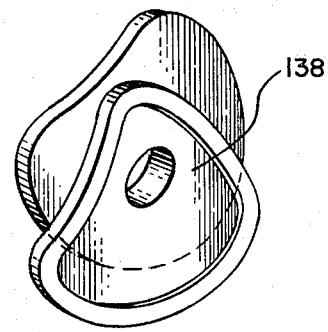
FIG. 5B is a perspective view of a double-profile cam of the type depicted in FIG. 5A.

A positive motion cam of the type used in the preferred embodiment of the present invention is shown in FIGS. 5A and 5B. In FIG. 5A, as camshaft 118 is driven or rotated about axis 120 by drive means (not shown) such as an electric motor, complimentary or double profile cam 122, which is fixedly attached to said camshaft 118, rotates simultaneously therewith. As camshaft 118 and cam 122 rotate, cam surface 124 engages roller 126 or cam surface 128 engages roller 130, which are rotatably mounted on cam follower 132, causing said follower 132 and output shaft 134 on which said follower is fixedly mounted, to rotate in one direction and then another about axis 136. As camshaft 118 rotates through 180°, output shaft 134 is rotated about axis 132 as cam surface 124 engages cam roller 126, from a first rest position to a second rest position through its entire range of either clockwise or counterclockwise movement. During the next 180° of camshaft 118 rotation, cam face 128 engages roller 130, causing output shaft 134 to reverse direction and rotate from said second rest position backward to said first rest position. This sequence is repeated in an oscillatory manner for every subsequent 360° rotational cycle of double profile cam 122. Cam 138 in FIG. 5B is a more detailed view of a complimentary or double profile cam of the type that includes cam 122 in FIG. 5A.

DISCUSSION

The assembly machine described above in the preferred embodiment utilizes three basic motions generated by the rotation of cams 50, 52 and 54 to move a product or workpiece between a series of workstations and to assemble portions of said workpiece within each of said workstations. This has been accomplished, in part, by grouping all of the required motions needed to perform the assembly operation into one of three possible homogeneous groups or categories and having one cam provide all of the required motions or movements for one category. In the case of the assembly machine of the preferred embodiment, the three categories are: (1) movement of the workpiece or workpieces into a workstation; (2) movement of a tool or tools to a position where it can perform an operation on said workpiece; and (3) a movement that actuates said tool or tools to perform an operation on said workpiece. In other assembly machines or in other apparatus, it may be necessary to increase or decrease the number of categories and, therefore, the number of motion-generating cams that are needed for the required motions. However, three categories of motions or movements will be satisfactory for most applications.

In prior art arrangements, a plurality of cams are clustered about each workstation in, for example, an assembly machine. These cams and the mechanical linkages, couplings, arms, etc. required to connect the motions generated by these cams to their associated workstations require a substantially larger amount of space for mounting and cam/linkage movement than an arrangement employing the inventive concept of the present invention. In the preferred embodiment, for example, the cams would be centrally located in remote from all assembly machine workstations and only three sets of linkages would be utilized for coupling the cam motions to a particular workstation. Therefore, a large amount of space for cam/linkage mounting and movement at or near a workstation of any assembly machine employing the inventive concept of the present invention is not required.

In the design of apparatus that utilizes a plurality of workstations to perform a series of operations on a product or workpiece, it is often necessary to reposition a cam on its camshaft because of the interference between motions generated by cams that are already positioned on a camshaft, with the motions generated by a cam that is subsequently added to the same camshaft. In the present invention, the position of all cams are permanently set or fixed at the outset and this forces the apparatus designer to obtain all of the required motions from these preset cams which makes it unnecessary to reposition an already positioned cam.

It will be apparent to those skilled in the art from the foregoing description of my invention, that various improvements and modifications can be made in it without departing from its true scope. The embodiments described herein are merely illustrative and should not be viewed as the only embodiments that might encompass my invention.

What is claimed is:

1. Apparatus for performing a series of operations on a workpiece at a plurality of spaced-apart workstations, comprising:
    energizable drive means;
    cam means having a plurality of rotatably mounted cams remote from at least one of said workstations, each of said cams being coupled to said drive means to provide a plurality of specific cam-shape related motions to each of said workstations when rotated by said drive means;
    a plurality of movably mounted tools with at least one tool at each of said workstations, each tool movable between a displaced position where it does not interfere with workpiece movement and a work position where it can be actuated to perform a particular operation on a workpiece at a workstation; and
    coupling means for coupling the motions provided by each of said cams to said workpiece for moving said workpiece into each of said plurality of workstations, for positioning said tools between their said displaced positions and their said work positions, and for actuating said tools when in their said work positions to perform said particular operation on said workpiece, with all of the cam motions that are needed to move a workpiece into a particular workstation, to position a tool for a subsequent operation on a workpiece at said particular workstation and to actuate a tool to perform said subsequent operation on a workpiece being provided by said cams to each of said workstations within a single cam means rotational cycle.

2. Apparatus for performing one or more operations on one or more workpieces at a plurality of spaced-apart workstations, said apparatus comprising:
    first actuatable means for moving a workpiece into and out of each workstation;
    second actuatable means for moving at least one tool at each workstation between an operational position where the tool is actuatable to perform a particular operation on a workpiece located at that station and a remote position where the tool is displaced from said operational position so as not to interfere with movement of a workpiece into or out of that workstation;
    third actuatable means for operating each tool to perform its operational function on the workpiece located in its respective workstation; and
    first, second and third cams, remote from at least one of said workstations, rotatably mounted in camming engagement with said first, second and third means respectively and in fixed intercoupled relationship to each other so as to actuate during a single camming cycle of said intercoupled cams, said first, second and third means in sequence to move a workpiece into each workstation, move each tool from its remote to its said operational position, operate each tool to perform its function on the workpiece located at its respective station, move each tool back to its remote position, and move the workpiece from each workstation.

3. The apparatus of claim 2, wherein each of said cams are of the double profile type.

4. The apparatus of claim 2, wherein said cams are driven by a plurality of mechanically coupled shaft members that are driven by a single rotational motion-producing device.

5. The apparatus of claim 4, wherein said rotational motion-producing device is an electric motor.

6. The apparatus of claim 2, wherein said series of operations are assembly operations on said workpiece.

7. Apparatus for performing a series of operations on a workpiece at a plurality of spaced-apart workstations, comprising:

energizable drive means;

cam means having first, second and third rotatably mounted cams remote from at least one of said workstations, each of said cams being coupled to said drive means to provide a specific cam-shape related motion when rotated by said drive means;

a plurality of movably mounted tools, each tool movable between a displaced position where it does not interfere with workpiece movement and a work position where it can be actuated to perform a particular operation on a workpiece at a workstation; and coupling means for coupling the motion provided by said first cam to said workpiece for moving said workpiece into said plurality of workstations, for coupling motion provided by said second cam to said tools for positioning said tools between their said displaced positions and their said work positions, and for coupling the motion provided by said third cam to said tools to actuate same to perform said particular operation on said workpiece, with all of the cam motions that are needed to move a workpiece into a particular workstation, to position a tool for a subsequent operation on a workpiece at said particular workstation and to actuate a tool to perform said subsequent operation on a workpiece being provided by said first, second and third cams within a single cam means rotational cycle.

8. The apparatus of claim 7, wherein each of said cams are of the double profile type.

9. The apparatus of claim 7, wherein said cams are driven by a plurality of mechanically coupled shaft members that are driven by a single rotational motion-producing device.

10. The apparatus of claim 9, wherein said rotational motion-producing device is an electric motor.

11. The apparatus of claim 7, wherein said series of operations are assembly operations on said workpiece.

* * * * *